(12) United States Patent
Coffey et al.

(10) Patent No.: US 10,196,506 B2
(45) Date of Patent: Feb. 5, 2019

(54) HEAT-ACTIVATED FABRICS MADE FROM BLENDS CONTAINING PROPYLENE-BASED POLYMERS

(71) Applicant: ExxonMobil Chemical Patents Inc., Baytown, TX (US)

(72) Inventors: James N. Coffey, League City, TX (US); Galen C. Richeson, Humble, TX (US); Jennifer J. Austin, The Woodlands, TX (US); Jurgen J. M. Schroeyers, Opvelp (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/527,125

(22) PCT Filed: Jul. 20, 2015

(86) PCT No.: PCT/US2015/041065
§ 371 (c)(1),
(2) Date: May 16, 2017

(87) PCT Pub. No.: WO2016/099605
PCT Pub. Date: Jun. 23, 2016

(65) Prior Publication Data
US 2017/0362420 A1    Dec. 21, 2017

Related U.S. Application Data

(60) Provisional application No. 62/094,119, filed on Dec. 19, 2014.

(51) Int. Cl.
*C08L 23/12* (2006.01)
*C08L 23/14* (2006.01)
*C08L 23/16* (2006.01)

(52) U.S. Cl.
CPC ............... *C08L 23/12* (2013.01); *C08L 23/14* (2013.01); *C08L 23/16* (2013.01)

(58) Field of Classification Search
CPC ...... C08L 23/14; C08L 23/12; C08L 2203/12; C08L 2205/025; C08L 2205/03; C08L 2314/00; C08L 2666/00; C08L 23/16; C08F 210/06; C08F 210/16; C08F 2500/12; C08F 2500/17; C08F 2500/02
See application file for complete search history.

(56) References Cited

U.S. PATENT DOCUMENTS

| | | | | |
|---|---|---|---|---|
| 6,080,818 | A * | 6/2000 | Thakker et al. | C08L 23/12 525/240 |
| 2007/0021566 | A1* | 1/2007 | Tse et al. | C09D 123/10 525/240 |
| 2009/0209158 | A1* | 8/2009 | Richeson et al. | B01D 39/1623 442/327 |
| 2012/0208422 | A1 | 8/2012 | Koori et al. | |
| 2012/0270039 | A1 | 10/2012 | Tynys et al. | |
| 2012/0302982 | A1 | 11/2012 | Takebe et al. | |
| 2015/0239204 | A1 | 8/2015 | Takebe et al. | |

* cited by examiner

*Primary Examiner* — Nathan M Nutter

(57) ABSTRACT

The invention relates to an heat-activated fabric comprising a polymer blend of 70 to 100 wt % of a polymer blend component and 0 to 30 wt % of a propylene polymer, wherein the polymer blend component comprises a first propylene-based polymer, wherein the first propylene-based polymer is a homopolymer of propylene or a copolymer of propylene and ethylene or a $C_4$ to $C_{10}$ alpha-olefin and a second propylene-based polymer, wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer and wherein the polymer blend component has a MFR of greater than or equal to 20 g/10 min to less than 10,000 g/10 min; and wherein the propylene polymer has a MFR of greater than or equal to 20 g/10 min to less than 5,000 g/10 min.

20 Claims, No Drawings

HEAT-ACTIVATED FABRICS MADE FROM BLENDS CONTAINING PROPYLENE-BASED POLYMERS

PRIORITY CLAIM

This application is a National Phase Application claiming priority to PCT Application Serial No. PCT/US2015/041065 filed Jul. 20, 2015, and claims priority to and the benefit of U.S. Ser. No. 62/094,119, filed Dec. 19, 2014, the entirety of which are hereby incorporated by their reference.

FIELD OF THE INVENTION

This invention relates to heat-activated fabrics made from propylene-based polymer compositions.

BACKGROUND OF THE INVENTION

The use of heat-activated fabrics to adhere, for example, logos or patches to another fabric item is well known. Heat-activated fabrics are often used as a time-effective alternative to conventional stitching processes. However, those fabrics that are currently usable for such applications are often limited to the substrates to which they can adhere, for example only to cotton-based clothing.

It is therefore desirable to form a fabric having a unique polymer composition useful as a heat-activated fabric for a variety of flexible and rigid substrates alike, including, but not limited to, cardboard, wood, file folders, stainless steel, kitchen laminates, and cotton canvas.

SUMMARY OF THE INVENTION

The invention relates to heat-activated fabrics comprising a polymer blend of from about 70 to about 100 wt % of a polymer blend component and from about 0 to about 30 wt % of a propylene polymer, wherein the polymer blend component comprises a first propylene-based polymer, wherein the first propylene-based polymer is a homopolymer of propylene or a copolymer of propylene and ethylene or a $C_4$ to $C_{10}$ alpha-olefin and a second propylene-based polymer, wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer and wherein the polymer blend component has a MFR, measured according to ASTM D-1238 at 230° C. and 2.16 kg, of greater than or equal to about 20 g/10 min to less than about 10,000 g/10 min; and wherein the propylene polymer has a MFR, measured according to ASTM D-1238 at 230° C. and 2.16 kg, of greater than or equal to about 20 g/10 min to less than about 5,000 g/10 min.

DETAILED DESCRIPTION OF THE INVENTION

Adhesive articles comprising a blend of a low molecular weight and/or high melt flow rate homopolymer of propylene or a copolymer of propylene and ethylene or a $C_4$ to $C_{10}$ alpha-olefin and optionally at least one high melt flow rate and/or low viscosity propylene-based polymer are provided herein, as well as methods for forming the same.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

"Propylene-based" or "predominantly propylene-based" as used herein, is meant to include any polymer comprising propylene, either alone or in combination with one or more comonomers, in which propylene is the major component (i.e., greater than 50 mol % propylene).

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

As used herein, "nonwoven fabric" means a web structure of individual fibers or filaments that are interlaid, but not in an identifiable manner as in a knitted fabric. In nonwoven fabrics, the fibers are processed directly into a planar sheet-like fabric structure and then are either bonded chemically, thermally, or interlocked mechanically (or both) to achieve a cohesive fiber. Furthermore, "nonwoven" refers to a textile material that has been produced by methods other than weaving.

Polymer Blend Component

The Polymer Blend Component ("PBCs") useful for making the fibers and fabrics of the invention comprise a first predominantly propylene-based polymer, wherein the first predominantly propylene-based polymer is a homopolymer of propylene or a copolymer of propylene and ethylene or a $C_4$ to $C_{10}$ alpha-olefin; and a second predominantly propylene-based polymer, wherein the second predominantly propylene-based polymer is a homopolymer of propylene or comprises a comonomer of ethylene or a $C_4$ to $C_{10}$ alpha-olefin; wherein the second predominantly propylene-based polymer is compositionally different than the first predominantly propylene-based polymer.

Methods of Preparing PBCs

A solution polymerization process for preparing a PBC is generally performed by a system that includes a first reactor, a second reactor in parallel with the first reactor, a liquid-phase separator, a devolatilizing vessel, and a pelletizer. The first reactor and second reactor may be, for example, continuously stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final PBC. For fiber compositions, ethylene and hexene are particularly preferred comonomers for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer.

It should be appreciated that any number of additional reactors may be employed to produce other polymers that may be integrated with (e.g., grafted) or blended with the first and second polymers. Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer PBCs, particularly in cases in which one of the polymers of the PBC has a weight average molecular weight less than 100,000 g/mol, and even more particularly between 10,000 g/mol and 60,000 g/mol. The concentration of polymer in the polymer lean phase may be further reduced by catalyst selection. Catalysts of Formula I (described below), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the PBC and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the PBC is then discharged through a pelletization die as formed pellets. Pelletization of the polymer may be by an underwater, hot face, strand, water ring, or other similar pelletizer. Preferably, an underwater pelletizer is used, but other equivalent pelletizing units known to those skilled in the art may also be used. General techniques for underwater pelletizing are known to those of ordinary skill in the art.

International Publication No. WO2013/134038, incorporated herein in its entirety, generally describes the method of preparing PBCs.

Polymers of the PBCs

Preferred polymers of the PBC are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

In any embodiment, one or more polymers of the PBC may comprise one or more propylene-based polymers, which comprise propylene and from about 5 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more polymers of the PBC may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %/o, or at least about 80 mol %, or at least about 81 mol % propylene-derived units, or at least about 82 mol % propylene-derived units, or at least about 83 mol % propylene-derived units; and in these or other embodiments, the copolymers may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the PBC of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the PBC (as determined by DSC) may be less than about 130° C., or less than about 120° C., or less than about 115° C., or less than about 110° C., or less than about 100° C., or less than about 90° C. In any embodiment, the Tm of the one or more polymers of the PBC may be greater than about 25° C., or greater than about 30° C., or greater than about 35° C., or greater than about 40° C. Tm of the one or more polymers of the PBC can be determined by taking 5 to 10 mg of a sample of the one or more polymers, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., ramping the temperature at a rate of 10° C. per minute up to 200° C., maintaining the temperature for 5 minutes, and recording the temperature as Tm.

In one or more embodiments, the crystallization temperature (Tc) of the one or more polymers of the PBC (as determined by DSC) is less than about 100° C., or less than about 90° C., or to less than about 80° C., or less than about 70° C., or less than about 60° C., or less than about 50° C., or less than about 40° C., or less than about 30° C., or less than about 20° C., or less than about 10° C. In the same or other embodiments, the Tc of the polymer is greater than about 0° C., or greater than about 5° C., or greater than about 10° C., or greater than about 15° C., or greater than about 20° C. In any embodiment, the Tc lower limit of the polymer may be 0° C., 5° C., 10° C., 20° C., 30° C., 40° C., 50° C., 60° C., and 70° C.; and the Tc upper limit temperature may be 120° C., 110° C., 100° C., 90° C., 80° C., 70° C., 60° C., 50° C., 40° C., 30° C., 25° C., and 20° C. with ranges from any lower limit to any upper limit being contemplated. Tc of the polymer blend can be determined by taking 5 to 10 mg of a sample of the polymer blend, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., and recording the temperature as Tc.

The polymers suitable for use in the PBC are said to be "semi-crystalline," meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65%/c of the crystallinity of isotactic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer of the PBC can have a level of isotacticity expressed as percentage of isotactic triads (three consecutive propylene units), as measured by $^{13}$C NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Patent Application Publication No. 2004/0236042.

The semi-crystalline polymer of the PBC may have a tacticity index m/r ranging from a lower limit of 4, or 6 to an upper limit of 10, or 20, or 25. The tacticity index, expressed herein as "m/r", is determined by $^{13}$C nuclear magnetic resonance ("NMR"). The tacticity index m/r is calculated as defined by H. N. Cheng in *Macromolecules*, 17, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer of the PBC may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature and determined according to ASTM D-792.

In one or more embodiments, the semi-crystalline polymer of the PBC can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ (also referred to as polydispersity index) where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, *Macromolecules*, Volume 34, Number 19, pp. 6812-6820, 2001. In one or more embodiments, the PBC can have a polydispersity index of from about 1.5 to about 6.

In an embodiment, the PBC has a melt viscosity, measured at 190° C. within the range of from about 800 or 1,000 or 5,000 cP to about 10,000 or 15,000 cP. In an embodiment, the PBC has a Melt Flow Rate ("MFR", 230° C./2.16 kg) within the range of from about 1,000 or 2,000 g/10 min to about 5,000 or 10,000 g/10 min.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hrs before injecting the first sample. The LS laser is turned on 1 to 1.5 hrs before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, P(θ) is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone Bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v = (\Sigma c_i M_i^\alpha / \Sigma c_i)^{1/\alpha}$$

In one or more embodiments, the semi-crystalline polymer of the PBC may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

The polymers that may be used in the fiber compositions disclosed herein generally include any of the polymers formed as disclosed in International Publication No. WO2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

Polymers and blended polymer products are also provided. In any embodiment, one or more of the polymers described herein may be blended with another polymer, such as another polymer described herein, to produce a physical blend of polymers.

Catalysts/Activators for Preparing PBCs

In any embodiment, the catalyst systems used for producing semi-crystalline polymers of the PBC may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

In any embodiment, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3,'5'-di-tert-butylphenyl) indenyl) zirconium dimethyl, (dimethylsilyl)bis(2-methyl-4-(3,'5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz (f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclopropylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers of the PBC may comprise a cationic component. In any embodiment, the cationic component may have the formula $[R^1R^2R^3AH]^+$, where A is nitrogen, $R^1$ and $R^2$ are together a $-(CH_2)_a-$ group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

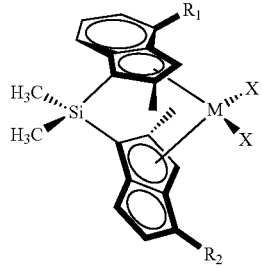

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, $R_1$ and $R_2$ may be independently selected from the group consisting of hydrogen, phenyl, and naphthyl. $R_1$ is preferably the same as $R_2$. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalyst. A particularly advantageous activator is dimethylaniliniumtetrakis(heptafluoronaphthyl) borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x-Al-O)_n$, which is a cyclic compound, or $R^x (R^x-Al-O)_n AlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Solvents for Preparing PBCs

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

International Publication No. WO2013/134038 generally describes the catalysts, activators, and solvents used to prepare the polymer blend used in the fiber compositions.

Suitable commercially available PBC include but are not limited to Vistamaxx™ grades available from ExxonMobil Chemical, Versify™ grades available from Dow Chemical, and other elastomers that are miscible in propylene-based polymers.

Propylene Polymers

The Propylene Polymers ("PPs") useful for making the fibers and fabrics of the invention is a homopolymer of propylene or a copolymer of propylene and within the range from 0.05 or 0.1 or 0.5 wt % to 2.0 or 4.0 wt % ethylene or $C_4$ to $C_{10}$ α-olefin comonomer derived units. Preferably, the PPs useful herein is a homopolymer of propylene. The PP is preferably a high crystallinity polypropylene, having a crystallinity of at least 40%, more preferably at least 70% or 80% or 90% as determined by DSC. Preferably, the polypropylene has a melting point temperature ("$T_m$", DSC) within the range of from 130° C. or 140° C. or 150° C. to 160° C. or 165° C. or 170° C. In an embodiment, the PP has a Melt Flow Rate ("MFR", 230° C./2.16 kg) within the range of from 100 or 500 or 1,000 g/10 min to 1,500 or 2,000 or 3,000 or 5,000 g/10 min. In an embodiment, the PP has a melt viscosity at 190° C. within the range of from about 10,000 to about 15,000 cP.

Catalysts/Activators for Preparing PPs

The PPs can be produced with a catalyst system comprising one or more metallocenes. As used herein "metallocene" refers generally to compounds represented by the formula $Cp_mMR_nX_q$ wherein Cp is a cyclopentadienyl ring which may be substituted or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1-3, n=0-3, q=0-3, and the sum of m+n+q is equal to the oxidation state of the transition metal. Methods for preparing and using these types of metallocenes are well known. These metallocenes are discussed extensively in U.S. Pat. Nos. 4,769,510; 4,933,403; 5,120,867; and 5,314,973; each fully incorporated herein by reference.

Metallocenes are generally used in combination with some form of activator in order to create an active catalyst system. Ionizing activators may also be used with metallocenes. Ionizing activators may be neutral or ionic, or compounds such as tri(n-butyl)ammonium tetrakis(pentafluorophenyl)boron, which ionize the neutral metallocene compound. Such ionizing compounds may contain an active proton, or some other cation associated with but not coordinated or only loosely coordinated to the remaining ion of the ionizing compound. Combinations of activators may also be used; see for example, International Publication No. 94/07928.

The metallocene catalyst systems described above are preferably fixed on a support material. Preferably, the support material is a porous particulate material, such as talc, inorganic oxides, inorganic chlorides and resinous materials such as polyolefin or polymeric compounds.

The preferred support materials are porous inorganic oxide materials, which include those from the Periodic Table of Elements of Groups 2, 3, 4, 5, 13 or 14 metal oxides. Silica, alumina, silica-alumina, and mixtures thereof are most preferred. Other inorganic oxides that may be employed either alone or in combination with the silica, alumina or silica-alumina, are magnesia, titania, zirconia, and the like.

It is also appreciated that the PP can be prepared using a Ziegler-Natta based catalyst system.

Polymerization Process for Preparing PPs

The catalyst systems may be used to polymerize propylene and optionally comonomers in any process including gas, slurry or solution phase or high pressure autoclave processes. Preferably, a gas or slurry phase process is used, most preferably a bulk liquid propylene polymerization process is used.

In the preferred embodiment, this invention is directed toward the bulk liquid polymerization and copolymerization of propylene or ethylene, particularly propylene, in a slurry or gas phase polymerization process, particularly a slurry polymerization process. Another embodiment involves copolymerization reactions of propylene or ethylene, particularly propylene, with one or more of the alpha-olefin monomers having from 4 to 20 carbon atoms, preferably 4-12 carbon atoms, for example alpha-olefin comonomers of ethylene, butene-1, pentene-1, 4-methylpentene-1, hexene-1, octene-1, decene-1, and cyclic olefins such as styrene, cyclopentene or norbornene. Other suitable monomers include polar vinyl, diolefins such as dienes, for example, 1,3-butadiene, 1,4-hexadiene, norbornadiene or vinylnorbornene, acetylene and aldehyde monomers.

In another embodiment, propylene is polymerized with at least two different comonomers to form a terpolymer and the like, the preferred comonomers are a combination of alpha-olefin monomers having 3 to 10 carbon atoms, more preferably 3 to 8 carbon atoms, and/or dienes having 4 to 10 carbon atoms.

Typically, in a gas phase polymerization process, a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922; and 5,436,304 all of which are fully incorporated herein by reference).

A slurry polymerization process generally uses pressures in the range of about 1 to about 500 atmospheres or even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be, for example, an alkane or a cycloalkane. The medium employed should be liquid under the conditions of polymerization and relatively inert. Non-limiting examples of liquid mediums include hexane and isobutane.

Suitable PPs for use in the present invention include Achieve™ grades available from ExxonMobil Chemical. The present invention is not limited to Achieve™ grades as the propylene-based polymer. It is appreciated that other propylene-based polymers may be suitable for use in the present invention, including those available from Lyondell-Basell Industries (LBI), Borealis, PolyMirae, and Total.

Polymer Blends

In an embodiment, polymer blends according to the present invention may comprise at least one PBC and at least one PP. The blend may comprise from about 70 to about 100 wt % PBC, or from about 70 to about 95 wt % PBC, or from about 80 to about 90 wt % PBC. The polymer blends can be made by dry-blending a PP with a PBC, by metering the components directly into an extruder at the desired ratio, or by melt-blending the components. In an embodiment, polymer blends according to the present invention are substantially free of a PP, and have only a PBC component.

A variety of additives may be incorporated into the polymer blends described herein, depending upon the intended purpose. For example, when the blends are used to form adhesive articles for use as heat-activated fabrics, such additives may include but are not limited to stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Nucleating agents include, for example, sodium benzoate and talc. Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Heat-Activated Fabrics Prepared from Polymer Blends

The polymer blends described herein are particularly useful in heat-activated fabric applications. The present invention is directed not only to fabric compositions, but also to processes for forming fabric compositions comprising the polymer blends described herein. In one or more embodiments, such methods comprise the steps of forming a molten polymer composition comprising a blend of at least one PBC and optionally at least one PP as described above, and forming a fabric comprising the polymer blend.

The fabric compositions of the present invention can be formed by any method known in the art. For example, the fabrics may be produced by a spunmelt process. In certain embodiments herein, the layer or layers of the fabric compositions of the invention are produced by a spunbond process. When the compositions further comprise one or more layers, the layers may be produced by a meltblown process, by a spunbond or spunlace process, or by any other suitable nonwoven process known in the art.

The heat-activated fabric compositions described herein may be applied to one or more substrates by any of the methods known in the art. For instance, the compositions may be heat-activated by radiation, convention, conduction, or laser light. In addition, it is appreciated that the fabric compositions may contain materials that react with microwave radiation, allowing for heat-activation of the composition using a microwave or other energy beam.

Examples

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

PBC 1 identified in Table 1 was used in the examples of the invention. The invention is not limited to PBC 1, as it is appreciated that other propylene-based components, such as PBC 2 of Table 1, may also be suitable for the invention. Each PBC used was prepared by the process described herein.

TABLE 1

| | PBC Compositions | | | |
|---|---|---|---|---|
| Sample # | Viscosity (cP at 190° C.) | MFR (g/10 min)* estimated | $C_2$ Content (wt %) | Density (g/cm$^3$) |
| PBC 1 | 8,000 | 2,000 | 11.5 | 0.879 |
| PBC 2 | 4,000 | 3,500 | 12.5 | 0.879 |

PP 1 identified in Table 2 was used in the examples of the invention. The invention is not limited to PP 2, as it is appreciated that other propylene-based polymers, such as PP 2 (corresponding to commercially available as PP3155 from ExxonMobil Chemical) or PP 3 (corresponding to commercially available as Achieve™ 3854 from ExxonMobil Chemical) of Table 2, may also be suitable for the invention. Each PP used was prepared by the process described herein.

TABLE 2

PP Composition

| Sample # | Viscosity (cP at 190° C.) | MFR (g/10 min) |
|---|---|---|
| PP 1 | 6,000 | 2,500 |
| PP 2 |  | 36 |
| PP 3 |  | 24 |

The Polymer Blends identified in Table 3 include inventive Polymer Blends used in the examples. Each inventive Polymer Blend used was prepared by the process described herein.

TABLE 3

Polymer Blend Compositions

| Sample # | PBC | PBC (wt %) | PP | PP (wt %) |
|---|---|---|---|---|
| 1 | PBC 1 | 100 | n/a | 0 |
| 2 | PBC 1 | 90 | PP 1 | 10 |
| 3 | PBC 1 | 85 | PP 1 | 15 |
| 4 | PBC 1 | 75 | PP 1 | 25 |

The Polymer Blends were then melt-blown to prepare fabric compositions for testing of adhesion as a heat-activated fabric. Meltblown fabrics were prepared using a meltblown process well known in the art for fabric production. An overview of the process may be obtained from *Melt Blown Process*, Melt Blown Technology Today 7-12 (Miller Freeman Publ., Inc. 1989). In addition, U.S. Pat. No. 7,081,299 discloses the conventional melt-blowing process, the content of which is incorporated herein by reference.

Specifically, the melt blown fabrics prepared using the inventive Polymer Blends were produced on a 1-meter wide Reicofil™ melt-blown pilot line. The melt-blown machine had a 30:1 L:D extruder and a conventional 1-m wide die. The melt-blown die had a single row of capillaries with 35 holes/inch and a capillary diameter of 0.4 mm. The set-back/air gap used in the die was 1.2 mm/1.2 mm. The materials were melted using a die temperature profile of 50/180/225/225/225° C. in the extruder. The screen changer, downstream piping and die temperature setpoints were kept at same temperature as the final extruder temperature setpoint of 225° C. The actual melt temperature of the polymer varied depending on viscosity, temperature profile, and throughput rate. The materials were extruded at rates of about 0.5 grams/hole/min (ghm) and about 0.6 ghm. The pressurized process air was heated to a temperature similar to that of the die. Air rates were adjusted to obtain good uniformity without producing "fly" or drips. Depending on the material, air rates from about 650 m³/hr to about 900 m³/hr were used. The fabrics were meltblown onto a 12 gsm spunbond polyester scrim to prevent the fabrics from sticking to the belt on the melt blown equipment. The fabrics were wound onto rolls and doffed for later testing. Fabric rolls of Sample 1 made by meltblowing onto a polyester scrim could be unwound immediately after production, but tended to block after storage. Fabrics made with Samples 2, 3, or 4 were less likely to block.

Some of the fabrics made from the polymer blend compositions of Table 3 were evaluated for bond strength, as reported below in Table 4. Bond Strength, as reported in Table 4, was determined as follows: a 1 inch×1 inch square of Sample 1 was placed between 2 of the same substrates, as listed in Table 4 and placed in an oven at 177° C. for 1 hour with a 500 g weight on top. The substrate-Sample 1-substrate article was cooled and pulled apart at room temperature, increasing the load, until the bond broke. The Bond Strength, measured in Newtons, is the force at which the bond broke. The measurement was repeated for various substrates.

TABLE 4

Fabric Bond Strength

| | | Rigid Substrates | | | | | Flexible Substrates | | |
|---|---|---|---|---|---|---|---|---|---|
| Test No. | Sample # | Substrate: Cardboard | Substrate: Thin Wood Sample | Substrate: File Folder Card Stock | Substrate: Stainless Steel | Substrate: Kitchen Counter Laminate | Substrate: Medium Wood Sample | Substrate: Cotton Canvas Fabric | Substrate: Kraft Paper | Control Sample 1 |
| 1 | 1 | 270 | 463 | 171 | 820 | 222 | 84 | 1.2 | 98 | 21 |
| 2 | 1 | 302 | 485 | 336 | 762 | 371 | 289 | 1.2 | 100 | 16 |
| 3 | 1 | 320 | 707 | 363 | 231 | n/a | 111 | 12.5 | 75 | 14 |
| 4 | 1 | 334 | n/a | 166 | 615 | n/a | 106 | 6 | 69 | n/a |
| 5 | 1 | 350 | n/a | n/a | 518 | n/a | 359 | 9 | n/a | n/a |
| 6 | 1 | n/a | n/a | n/a | 645 | n/a | n/a | 7 | n/a | n/a |
| 7 | 1 | n/a | n/a | n/a | 393 | n/a | n/a | 165 | n/a | n/a |

The Polymer Blends of Table 4 were melt-blown according to the methods previously described to evaluate the melting behaviors. As Table 4 indicates, the Bond Strength of the heat-activated fabric composition was higher for rigid substrates as compared to flexible substrates. The Control of Table 4 is the measurement of the pure heat-activated fabric, which is fairly low. It is appreciated that the Control has a fairly low strength by itself because the heat-activated fabric is composed of multiple small fibers that when heated melt the fibers, fusing them together to enable strong adhesion to a substrate.

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A heat-activated fabric comprising a polymer blend of from about 70 to about 90 wt % of a polymer blend component and from about 10 to about 30 wt % of a propylene polymer,
    wherein the polymer blend component comprises a first propylene-based polymer, wherein the first propylene-based polymer is a copolymer of propylene and ethylene or a $C_4$ to $C_{10}$ alpha-olefin and a second propylene-based polymer, wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer and wherein the polymer blend component has a MFR, measured according to ASTM D-1238 at 230° C. and 2.16 kg, of greater than or equal to about 20 g/10 min to less than about 10,000 g/10 min; and
    wherein the propylene polymer has a MFR, measured according to ASTM D-1238 at 230° C. and 2.16 kg, of greater than or equal to about 20 g/10 min to less than about 5,000 g/10 min.

2. A heat-activated fabric comprising a polymer blend of from about 70 to about 90 wt % of a polymer blend component and from about 10 to about 30 wt % of a propylene polymer,
    wherein the polymer blend component comprises a first propylene-based polymer, wherein the first propylene-based polymer is a copolymer of propylene and ethylene or a $C_4$ to $C_{10}$ alpha-olefin and a second propylene-based polymer, wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer, wherein the polymer blend component has a melt viscosity, measured according to ASTM D-3236 at 190° C., of about 1,000 to about 10,000 cP; and
    wherein the propylene polymer has a melt viscosity, measured according to ASTM D-3236 at 190° C., of about 2,000 to about 20,000 cP.

3. The heat-activated fabric of claim 1, wherein the polymer blend component has a MFR, measured according to ASTM D-1238 at 230° C. and 2.16 kg, of greater than or equal to about 400 g/10 min to less than about 10,000 g/10 min.

4. The heat-activated fabric of claim 1, wherein the polymer blend component has a MFR, measured according to ASTM D-1238 at 230° C. and 116 kg, of greater than or equal to about 20 g/10 min to less than about 400 g/10 min.

5. The heat-activated fabric of claim 1, wherein the propylene polymer is a homopolymer of propylene or a copolymer of propylene units with from about 0.5 to about 4 wt % ethylene or $C_4$ to $C_{10}$ alpha-olefin comonomer derived units.

6. The heat-activated fabric of claim 1, wherein the polymer blend component has an Mw of about 10,000 g/mol to about 150,000 g/mol.

7. The heat-activated fabric of claim 1, wherein the polymer blend component is a dual reactor blend.

8. The heat-activated fabric of claim 1, wherein the polymer blend component is a solution blend and/or melt blend.

9. The heat-activated Fabric of claim 1, wherein the first propylene-based polymer of the polymer blend component comprises a copolymer of propylene and ethylene, and the second propylene-based polymer of the polymer blend component comprises a copolymer of propylene and ethylene.

10. The heat-activated fabric of claim 1, wherein the first propylene-based polymer of the polymer blend component and the second propylene-based propylene polymer of the polymer blend component have a difference in heat of fusion of at least 10 J/g.

11. An article comprising the heat-activated fabric of claim 1.

12. An article of claim 11, comprising the heat-activated fabric and one or more Substrates, wherein at least one of the one or more substrates comprises paper, cardboard, nonwoven fabric, metal, wood, cotton, other fiber based material, or combinations thereof.

13. A process to prepare a heat-activated fabric, comprising:
    combining into a polymer blend:
        from about 70 to about 90 wt % of a polymer blend component;
    wherein the polymer blend component comprises a first propylene-based polymer, wherein the first propylene-based polymer is a copolymer of propylene and ethylene or a $C_4$ to $C_{10}$ alpha-olefin and a second propylene-based polymer, wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer; and
        wherein the polymer blend component has a MFR, measured according to ASTM D-1238 at 230° C. and 2.16 kg, of greater than or equal to about 20 g/10 min to less than about 10,000 g/10 min; and
        b. from about 10 to about 30 wt % of a propylene polymer, wherein the propylene polymer has a MFR, measured according to ASTM D-1238 at 230° C. and 2.16 kg, of greater than or equal to about 20 g/10 min to less than about 5,000 g/10 min; and
    forming a non-woven fabric comprising the polymer blend.

14. The process of claim 13, wherein the polymer blend component has a melt viscosity, measured according to ASTM D-3236 at 190° C., of about 1,000 to about 10,000 cP, and wherein the propylene polymer has a melt viscosity, measured according to ASTM D-3236 at 190° C. of about 2,000 to about 20,000 cP.

15. The heat-activated fabric of claim 2, wherein the polymer blend component has a MFR, measured according to ASTM D-1238 at 230° C. and 2.16 kg, of greater than or equal to about 400 g/10 min to less than about 10,000 g/10 min.

16. The heat-activated fabric of claim 2, wherein the polymer blend component has a MFR, measured according to ASTM D-1238 at 230° C. and 2.16 kg, of greater than or equal to about 20 g/10 min to less than about 400 g/10 min.

17. The heat-activated fabric of claim 2, wherein the propylene polymer is a homopolymer of propylene or a copolymer of propylene units with from about 0.5 to about 4 wt % ethylene or $C_4$ to $C_{10}$ alpha-olefin comonomer derived units.

18. The heat-activated fabric of claim 2, wherein the polymer blend component has an Mw of about 10,000 mol to about 150,000 g/mol.

19. The heat-activated fabric of claim 2, wherein the polymer blend component is a dual reactor blend.

20. The heat-activated fabric of claim 2, wherein the polymer blend component is a solution blend and/or melt blend.

\* \* \* \* \*